Figure 1:
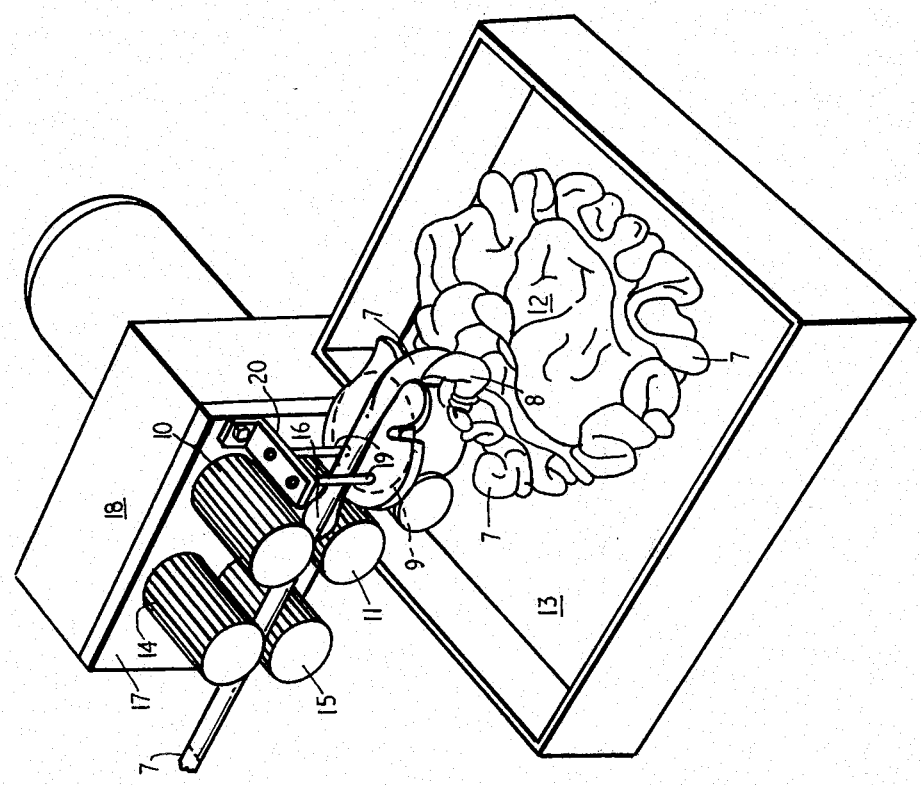

United States Patent [19]

Evers et al.

[11] 3,882,571
[45] May 13, 1975

[54] SEPARATION OF ANIMAL INTESTINES FROM THE STOMACH

[75] Inventors: Roy James Evers, Cronulla, New South Wales; Darcy Glen Perrett, Peakhurst, New South Wales, both of Australia

[73] Assignee: Davis & Geck Australia Pty. Limited, Hurstville, New South Wales, Australia

[22] Filed: July 31, 1973

[21] Appl. No.: 384,189

[30]   Foreign Application Priority Data
July 31, 1972   Australia............................ 9904/72

[52] U.S. Cl. .................................................. 17/43
[51] Int. Cl. ........................................... A22c 17/14
[58] Field of Search ............. 17/1 R, 43, 49, 50, 52, 17/58

[56]         References Cited
         UNITED STATES PATENTS
3,037,238   6/1962   Castlelow................................ 17/43
3,290,722   12/1966  Norks ..................................... 17/43

FOREIGN PATENTS OR APPLICATIONS
244,635     4/1963   Australia

Primary Examiner—Richard C. Pinkham
Assistant Examiner—Marvin Siskind
Attorney, Agent, or Firm—Ladas, Parry, Von Gehr, Goldsmith & Deschamps

[57]         ABSTRACT

Apparatus for separating the small intestine of a beast, such as a steer, from the stomach of the beast. The apparatus incorporates an orientation horn which has a longitudinal body and a curved leading end. An initial manual severing of the small intestine tube from the stomach is effected wherein the mesentery web holding the small tube to the stomach is severed as is a small portion of fatty tissue between the intestine tube and the outer wall of the stomach. The small piece of intestine tube so isolated from the stomach is fed on to the leading end of the orientation horn which is rounded to accept the intestine tube thereover. A cutter such as a rotary blade are positioned adjacent the horn so that as the small intestine tube is fed along the horn the cutter effect a severing of the mesentery web holding the small intestine tube to the stomach and also of the fatty tissue aforesaid. The small intestine tube is at first manually fed over the leading end of the orientation horn but the apparatus is provided with at least one pair of upper and lower rollers, at least one of these rollers being motor driven and at least one of them having a toothed resilient surface. The upper and lower rollers are disposed above and below the horizontal longitudinal body of the orientation horn and operate to pull the severed small intestine tube along the body of the orientation horn and at the same time to pull the remaining stomach portion with small intestine tube attached on to the leading end of the orientation horn and towards the rotary blade. The severed intestine tube may be collected after it has traversed the orientation horn.

7 Claims, 3 Drawing Figures

PATENTED MAY 13 1975

3,882,571

SHEET 2 OF 2

SEPARATION OF ANIMAL INTESTINES FROM THE STOMACH

This invention relates to apparatus for separating animal intestines, for example, the intestines of bullocks. More particularly, the invention relates to apparatus for separating from the stomach or crown of an animal the small intestine which is attached to the stomach in tubular form by the mesentery web. As is well known in the art, a lining of fat is also located between the tubular small intestine and the outer stomach wall.

Such separation process is required to be performed prior to the process of isolating and slitting of the valuable serosa membrane from the tubular small intestine. Such isolation and slitting process is the subject of our Australian Pat. No. 418,041. The serosa membrane is used, inter alia, for preparation of threads for use in surgical suturing.

Conventionally, the small intestine is separated from the stomach manually. In such a process the operator simply uses a knife to cut through the mesentery web, cuts through an initial portion of the tubular intestine and slits the small intestine from the stomach wall by severing the fat layer between the small intestine and the stomach wall.

This manual process requires a highly skilled operator in order to obtain an intestine tube which has a uniform and minimal amount of fatty tissue attached thereto. The requirement for a uniform cut is essential if accuracy in isolation and slitting of the serosa membrane, in subsequent operations is to be achieved.

It is difficult in the industry to find operators of sufficient skill to carry out the manual separation process efficiently. If a relatively unskilled operator is employed, experience shows that up to 30% of otherwise usable intestine is wasted owing to non-uniform separation or damage to the intestine itself.

It is an object of this invention to provide apparatus which will substantially limit the need for manual separation as described above.

For ease of description, apparatus of this invention will be described in the normal operating position and terms such as upper, lower, horizontal, etc. will be used with reference to this normal operating position. It will be understood, however, that apparatus of this invention may be manufactured, stored, transported and sold in orientations other than the normal operating position described.

This invention consists in apparatus for isolating the tubular small intestine from the stomach of a beast, said apparatus comprising orientation means having a leading end adapted to receive therearound a piece of small intestine tube and cutting means disposed adjacent said orientation means and adapted to sever the mesentery web holding the intestine tube to the stomach and the fatty lining between the tube and the stomach when the tube is fed along said orientation means towards the following end thereof.

One embodiment of this invention provides apparatus for isolating the tubular small intestine from the stomach of a beast, comprising an orientation horn having a longitudinal body supported in a substantially horizontal position between one or more pairs of opposing carrying rolls, said horn further having a leading end over which a length of small intestine which has been initially manually separated from the stomach may be fed, said leading end of the orientation horn being hooked below the horizontal body of the horn so that said leading end is located adjacent a substantially horizontal rotary blade, which blade is adapted to sever the mesentery web holding the intestine tube to the stomach and the fatty lining between the tube and the stomach when the tube is fed over and along the horn.

It will be understood that the intestine tube is first pulled over the leading end of the horn manually and then manually pulled along the horn until engaged by a first pair of opposing carrying rolls whereafter the tube may be pulled along the remainder of the horn manually or alternatively by operation of the carrying rolls, one or more of which may be motor driven.

Figure 2:
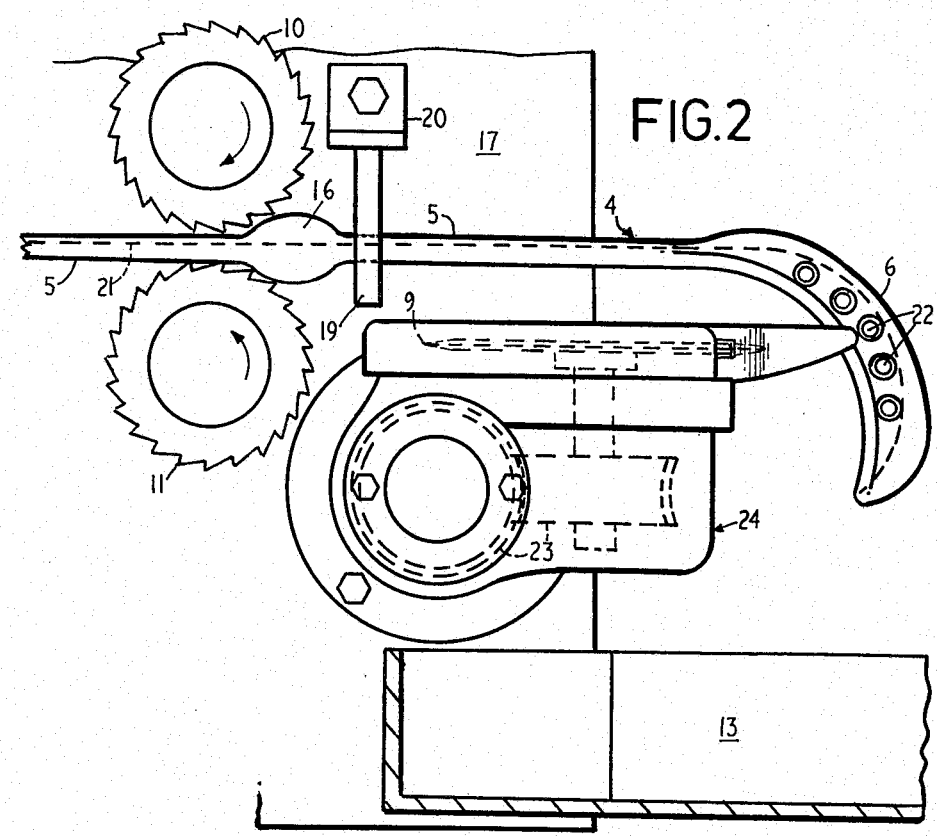
Figure 3:
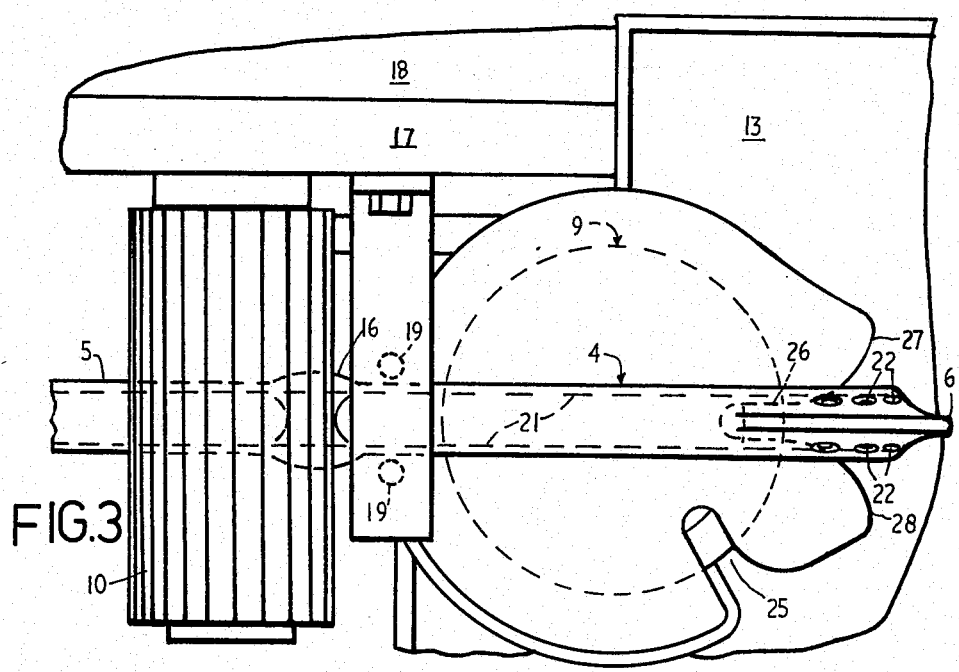

By way of example only, a preferred form of the invention is illustrated in the accompanying drawings in which:

FIG. 1 is a perspective view of the machine showing a cutting device and orientation horn according to this invention with an intestine tube being passed over the horn with the cutting device severing the stomach portion from the intestine tube, FIG. 2 is a fragmentary side elevation, to an enlarged scale, of the cutting device and orientation horn, and, FIG. 3 is a plan view of that part of the machine shown in FIG. 2.

The orientation horn 4 has a flat, elongated body portion 5 and a hook-shaped leading end 6 for engaging and smoothly passing through the tubular small intestine 7. The shape of the leading end is such that as the tubular small intestine 7 is drawn manually onto the horn 4, taking the stomach with it, the fatty tissue 8 attaching the small intestine to the stomach is nearest blade 9.

The rotary blade 9 has its axis of rotation substantially vertical and substantially perpendicular to the direction of movement of the small intestine 7 over the body 5 of the orientation horn 4.

As the initially manually separated portion of the small intestine 7 is drawn between the first pair of carrying rolls 10 and 11 and onto the body 5 of the horn 4, the portion of the small intestine 7 still attached to the stomach 12 is automatically pulled by the first set of rolls 10 and 11 over the rotating rotary blade 9 adjacent the hook-shaped end 6 of the horn 4 and the vertically hanging fatty tissue 8 joining the two previously mentioned elements, is severed. The remaining stomach portion falls away onto a tray 13 adjacent the apparatus.

As the small intestine tube 7 accumulates on the body 5 of the horn 4 between the two sets of carrying rolls 10 and 11 and 14 and 15, the leading portion of the intestine is automatically pushed into contact with the second set of rotating carrying rolls 14 and 15 and subsequently engages, and is pulled between the second set of rolls, and is thence pushed from the end of the body portion, and into a receiving container, not shown.

The body 5 of the orientation horn 4 is maintained in a substantially horizontal position between the two sets of carrying rolls 10 and 11 and 14 and 15, which rolls have resilient toothed exterior surfaces, of composition such as rubber, the surfaces of opposing rolls being in slidable pressure contact with the respective adjacent flat faces of the body 5 of the orientation horn 4.

The orientation horn 4 is prevented from being pulled through the carrying rolls by a raised portion 16 on each flat face of the body portion 5 adjacent the hook-shaped leading end 6 of the horn 4. The raised portions 16 extend the width of the body portion 5 and due to their effect of creating a substantially increased thickness of the body portion in that area, prevent the horn 4 from moving beyond the first set of carrying rolls 10 and 11 which rotate on fixed axes.

The carrying rolls 10 and 11 and 14 and 15 are of equal diameter and rotate at equal speeds and their axes of rotation are parallel to each other and perpendicular to the face place 17 of the conventional main gear box 18.

The body portion 5 of the orientation horn 4 may otherwise be known in the trade as a beater horn.

As best illustrated in FIG. 3 housing having shoulders 27 and 28 is provided for rotary blade 9. Recess 26 in this housing is provided between the shoulders 27 and 28 and the hook-shaped end 6 of the horn 4 is located in close proximity to the recess 26 so that severing as described above is effected by the rotary blade in the recess 26. A further recess 26 is provided in the housing of the rotary blade. A first severing of the intestine tube attached to the stomach may be effected by manually advancing the stomach to the portion of the rotary blade in this recess 25. Alternatively, an initial severing of the intestine tube attached to the stomach may be effected by manual use of a knife.

In order to prevent lateral displacement of the horn 4 with respect to the supporting rolls, two guide pins 19 extend vertically downward from a bracket 20 which is secured to the face plate 17. The pins 19 are adapted to engage the sides of the body 5 of the horn 4, thus preventing lateral displacement thereof.

A semi-circular groove 21 is cut in the underside of the body portion 5 of the horn 4 and a series of holes 22 are cut through the hooked portion 6 to communicate with said groove 21. The function of the groove 21 and holes 22 is to prevent air pressure effects hindering the passage of the intestine tube 7 along the body of said horn.

Blade 9 is driven through spiral gears 23 mounted in a gearbox 24 which is secured to the face plate 17 of the gearcase 18.

After the abovementioned separation process, the intestine tube 7 is ready for a subsequent process, not shown, of isolation and slitting of the valuable serosa membrane from the remaining fatty portion of the intestine.

What we claim is:

1. Apparatus for isolating tubular small intestine from the stomach of a beast, comprising an orientation horn having a longitudinal body freely supported near one end in a substantially horizontal position between one or more pairs of opposing carrying rolls, and a pair of substantially vertical guide pins, one on either side of the body of said horn to substantially prevent lateral displacement of said horn, said horn further having a leading end remote from the rolls over which a length of small intestine which has been initially manually separated from the stomach may be fed, said leading end of the orientation horn being hooked below the horizontal body of the horn so that said leading end is located adjacent a substantially horizontal rotary blade, which blade is adapted to sever the mesentery web holding the intestine tube to the stomach and the fatty tissue lining between the tube and the stomach when the tube is fed over and along the horn.

2. Apparatus as defined in claim 1 further comprising a housing for said rotary blade, said housing being provided with a recess therein adjacent the hooked end of said horn so that severing as described is effected by the blade rotating in said recess.

3. Apparatus as defined in claim 2 wherein said housing is provided with a further recess exposing a small portion of the rotary blade whereby the stomach and intestine tube may be advanced into said recess so that an initial severing of the intestine tube may be effected by the blade rotating in said further recess.

4. Apparatus as defined in claim 1 wherein the horizontal body portion of said horn is expanded adjacent the first pair of opposing carrying rolls to prevent the body of the horn between the hooked end of the horn and the said first rolls from being carried through said rolls.

5. Apparatus as defined in claim 1 wherein the outer surfaces of said rolls are composed of resilient toothed material.

6. Apparatus as defined in claim 1 wherein said horn is provided on its underside in the vicinity of the hooked end of said horn with a semi-circular groove and a plurality of holes communicating with said groove.

7. Apparatus for isolating the tubular small intestine from the stomach of a beast, comprising an orientation horn freely inserted between two sets of opposing carrying rolls mounted on the face plate of a multi output gearbox, and a pair of substantially vertical guide pins, one on either side of the body of said horn to substantially prevent lateral displacement of said horn, which horn is hooked at its leading portion adjacent a rotary blade, which blade is driven through an auxiliary spiral gearing attached to an output shaft on the face plate of the multi output gearbox, such that a sufficient length of intestine, which has been initially manually separated from the stomach, is pushed over the end of the orientation horn, across the rotary blade and into contact with the first set of opposing carrying rolls, which rolls pull the intestine to the body of the orientation horn, simultaneously pulling the remainder of the intestine attached to the stomach to the hooked leading end of the orientation horn and over the rotary blade, which blade is adapted to sever the intestine from the stomach.

* * * * *